April 22, 1930.  L. J. BORKHUIS, JR  1,755,534
MOWER GUARD
Filed Sept. 29, 1928  2 Sheets-Sheet 1

Inventor
L. J. Borkhuis, Jr.
By Arthur H. Sturges
Attorney

April 22, 1930. L. J. BORKHUIS, JR 1,755,534
MOWER GUARD
Filed Sept. 29, 1928   2 Sheets-Sheet 2
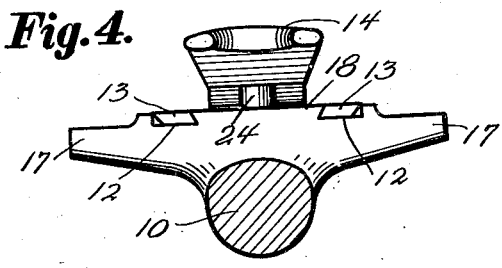
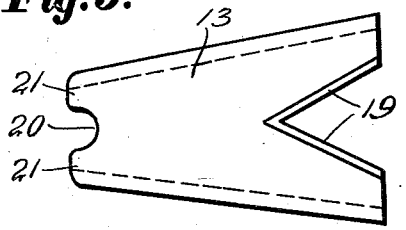
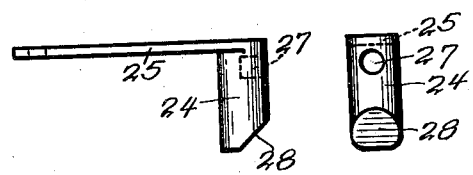
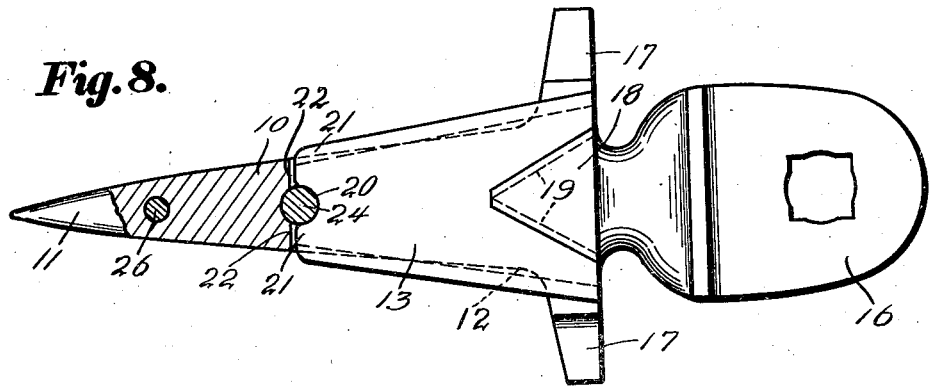
Inventor
L. J. Borkhuis, Jr.
By Arthur H. Sturges
Attorney Patented Apr. 22, 1930

1,755,534

UNITED STATES PATENT OFFICE

LOUIS J. BORKHUIS, JR., OF VAYLAND, SOUTH DAKOTA

MOWER GUARD

Application filed September 29, 1928. Serial No. 309,334.

The present invention relates to mower sickles, and more particularly to an improved mower guard and ledger plate fastening means combined therewith.

An object of the present invention is to provide a more perfect locking means for the ledger plates than has been heretofore utilized, and which during operation will not permit the ledger plates to become disengaged from the guard as has heretofore occurred by encountering weeds and heavy grasses, the latter forcing the ledger plates upwardly and moving it rearwardly out of engagement with its seat.

Another object of the invention is to provide a structure such as above outlined and wherein the ledger plate is provided with relatively long cutting surfaces at the side edges thereof.

The invention aims to do away with loose, detached springs and the like as has been heretofore used and which frequently become lost during the operation, adjustment and replacement of the part.

A further object of the invention is to provide a guard tooth which may be solid and proportionately stronger to withstand heavy stresses such as occasioned by contacting with stones and other solid obstructions during operation.

A still further object of the invention is to provide a novel form of detent or locking bolt for a ledger plate which will be automatically self-cleaning during operation and which will provide an easy means for removal of the ledger plate from its guard.

Other objects and advantages of this invention will be apparent from the following description when considered in connection with the accompanying drawings, and will be more particularly pointed out in the appended claims.

In the drawings:

Figure 4 is a transverse section taken through the rear end of the guard finger substantially on the line 4—4 of Figure 2, and looking in the direction of the arrows.

Figure 5 is a detail top plan view of a ledger plate constructed according to this invention.

Figure 6 is a side elevation, showing in detail the spring latch or detent used.

Figure 7 is a rear end elevation of the same.

Figure 8 is a top plan view of the complete device, the forward end thereof being shown in horizontal section as indicated on the line 8—8 in Figure 2.

Figure 1:
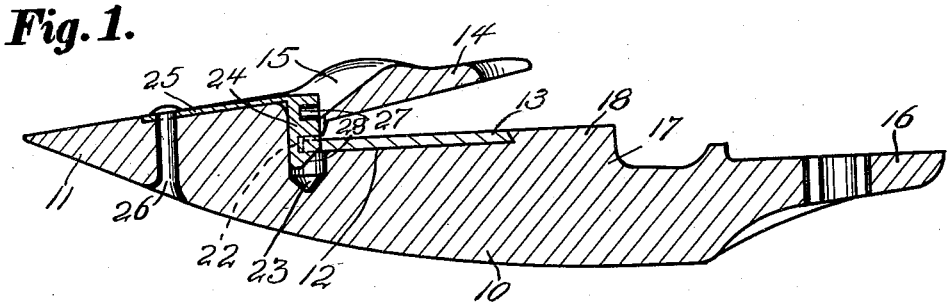
Figure 1 is a vertical longitudinal section taken centrally through one of the guard fingers with the improvements applied thereto.
Figure 2:
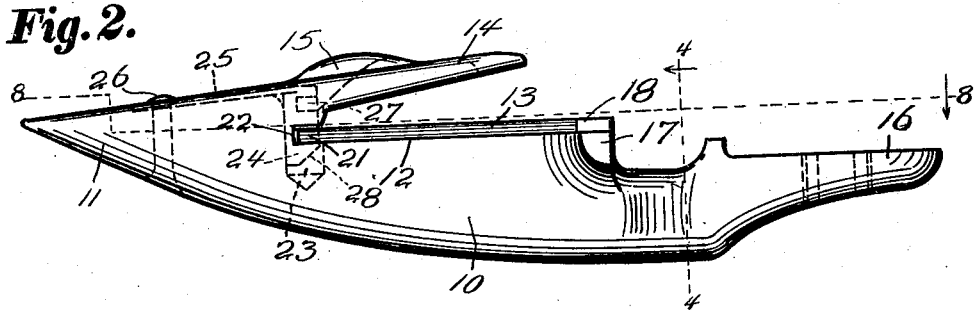
Figure 2 is a side elevation of the same.
Figure 3:
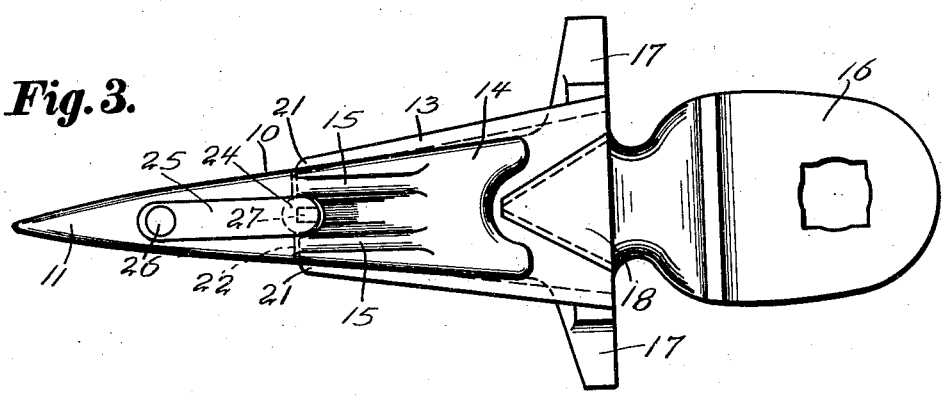
Figure 3 is a top plan view of the complete device.

Referring now to the drawings, in which like numerals of reference designate like or corresponding parts throughout the several views, 10 designates the body portion of a mower guard finger or tooth, which, as shown to advantage in Figure 1, is substantially integral or solid and presents a relatively rigid structure. The guard finger 10 is provided with the usual point or nose 11, and the intermediate portion of the guard plate is stepped downwardly at its upper surface to provide a seat 12 for receiving and supporting a ledger plate 13, the seat 12 being depressed in the upper face of the guard finger as shown in Figure 1. Finger 10 is provided, rearwardly of the nose 11, with an arm 14 which extends rearwardly and is inclined upwardly at a slight angle from the forward end of the seat 12 so as to overhang the ledger plate 13. This arm 14 is reinforced with a pair of ridges or ribs 15 which extend forwardly and merge into the upper face of the guard finger 10. The rear extremity of the guard finger 10 is provided with a shank 16 which is flattened and secured in the usual manner for attachment to the finger bar.

Adjacent the shank 16 the guard finger 10 is provided with a cross arm or transverse enlargement 17, the intermediate upper portion of which is in the form of a lug or projection 18 which lies flush with the upper surface of the ledger plate 13. The lug 18 is of substantially wedge or triangular form and is adapted to engage in a V-shape groove or slot 19 formed in the rear edge portion of the ledger plate 13. The sides of the lug 18 are undercut while the side walls of the slot 19 are beveled so that the rear end of the ledger plate is interlocked with the lug 18 when the ledger plate is moved backwardly into position. As shown in Figure 4, the end portions of the cross arm 17 may have its upper surface flush with the upper surface of the lug 18 for a short distance and opposite sides of the ledger plate 13 for protecting and holding the latter more firmly in position.

The forward end of the ledger plate 13 is provided with an intermediate recess 20 and lateral projections or lugs 21 at opposite sides of the recess. The lugs or projections 21 engage in sockets 22 which are formed in the rear face of the nose 11 of the guard finger beneath the forward end of the arm 14.

The guard finger 10 is provided with a keeper slot 23 which extends downwardly through the arm 14 between the ridges 15, and down into the body of the guard finger 10 at the forward end of the seat 12. This keeper slot 23 lies between the sockets 22 so as to register with the notch 20 in the ledger plate 13 when the latter is in position. A latch, detent or locking bolt 24 removably engages in the keeper slot 23 and projects downwardly thereinto for a distance below the seat 12. The bolt 24 is round, or of any other suitable configuration to fit the notch 20 so as to hold the forward end of the ledger plate 13 from edgewise displacement.

The bolt 24 is carried upon a flat spring arm 25 seated in a recess in the upper face of the nose 11 and which extends forwardly from the bolt 24 and is secured at its forward end by a rivet 26 or the like. The bolt 24 may be provided in its rear edge with a socket or opening 27 adapted to receive a nail or any other suitable pointed implement by means of which the bolt 24 may be lifted out of the keeper socket 23 against the tension of the spring 25. As best shown in Figures 6 and 7, the lower end of the bolt 24 may be beveled at its rear side, as shown at 28, to provide a cam surface adapted to operate against the forward end of the ledger plate 13 and force the latter backwardly into interlocking engagement with the lug 18.

When it is desired to remove the ledger plate 13, it is only necessary to insert a suitable instrument in the socket 27 of the bolt 24 and to draw the bolt upwardly against the tension of its spring 25. This action releases the forward end of the ledger plate 13 and the latter may then be moved forwardly out of engagement with the lug 18 and lifted from its seat 12. When replacing the ledger plate, the latter is placed on the seat and the bolt 24 released so that the spring 25 forces the bolt 24 downwardly and brings the cam face 28 against the forward end of the ledger plate 13. The ledger plate 13 is thus forced backwardly on its seat 12 so as to interlock the beveled or inclined edge portions of the lug and plate and thus securely hold the ledger plate from lifting upwardly from the finger guard.

It is of course understood that the toothed bar reciprocates within the recess formed beneath the arm 14 and cooperates with the latter edges of the ledger plates 13 for cutting grass and the like. During this operation, the ledger plates have a tendency to move forwardly within their seat and upon the guard fingers 10, particularly when cutting heavy grasses or weeds, and thus the ledger plates frequently become detached.

Further, ledger plates have heretofore been held in place by means of coil springs and the like which were not adapted to resist the forward movement of the plate so that these devices could not hold the plates from detachment from the guard fingers. It will be readily seen that by the arrangement above specifically described these disadvantages are obviated and the bolt or detent 24 serve to firmly hold and secure the ledger plates in position on their seats 12 and the bolt 24 can not be released by any reciprocating action of the cutter bar or the attendant action of heavy grasses or the like which are drawn through the machine.

It is of course understood that various changes and modifications may be made in the details of construction and design of the above specifically described embodiment of this invention without departing from the spirit thereof, such changes and modifications being restricted only by the scope of the following claims.

What is claimed is—

1. A guard finger having both nose and rearwardly extending arm, and having a ledger plate seat beneath said arm and a lug projecting upward from the rear end of said seat, a ledger plate on said seat provided with forwardly extending projections, said guard finger having sockets for said projections at the forward end of the seat, interlocking edge portions on said lug and ledger plate, and a locking bolt disposed in the guard finger for engagement between the projections of the ledger plate for holding the latter against edgewise displacement and against said lug.

2. A guard finger provided at its intermediate portion and in its upper surface with a depressed seat providing a socket portion at the forward end of the seat and an anchoring lug at the rear end of the seat, a ledger plate adapted to engage said seat and having a recess in its rear edge for the reception of said lug, said lug and said ledger plate having interlocking edge portions, a spring pressed locking bolt mounted in the forward end of the guard finger for engagement with the forward edge of said ledger plate for forcing the latter backwardly into interlocking engagement with said lug, said ledger plate having forwardly projecting portions at opposite sides of said bolt for engagement in the socket portions of said guard finger, said locking bolt having means for the withdrawal thereof from engagement with said ledger plate.

3. A guard finger comprising a relatively solid body portion having an integral nose and an integral shank at its rear end, said body portion having a transverse enlargement near its rear end and extending above the upper surface thereof to provide a lug, a ledger plate adapted to seat across the upper surface of the guard finger forwardly of the lug, said lug and said ledger plate having complemental edge portions adapted to interlock for holding the ledger plate against lifting movement from the guard finger, said ledger plate also having a recess in its forward end and forwardly projecting lugs at opposite sides of the recess, said guard finger having sockets at opposite sides adapted to receive the lugs of the ledger plate, said guard finger also having a keeper slot extending downwardly therein at the forward end of said ledger plate, a bolt removably fitting in said keeper slot and adapted to engage in the recess of the ledger plate for holding the latter from edgewise displacement and in interlocking engagement with said lug, the lower end of said bolt having a beveled rear face adapted to engage said ledger plate for forcing the same backwardly against said lug, and a spring arm carried by said bolt and secured to said guard finger for urging the bolt normally downward into said keeper slot.

4. A guard finger having a ledger plate seat across its intermediate portion and a projection rising from the rear end of said seat, a ledger plate having interlocking rear edge portions for engagement with said projection, a movable bolt mounted vertically in the guard finger at the forward end of said ledger plate for engagement with the latter when the ledger plate is in interlocking engagement with said projection, and spring means engaging the bolt for normally urging the same downwardly into engagement with the ledger plate.

In testimony whereof, I have affixed my signature.

LOUIS J. BORKHUIS, Jr.